Sept. 7, 1965 L. M. SOCCIO 3,204,267
THREADING MECHANISM
Filed March 2, 1961 2 Sheets-Sheet 1

Fig-1

Fig-2

INVENTOR.
LEWIS M. SOCCIO
BY Paul B. Fihe
PATENT AGENT

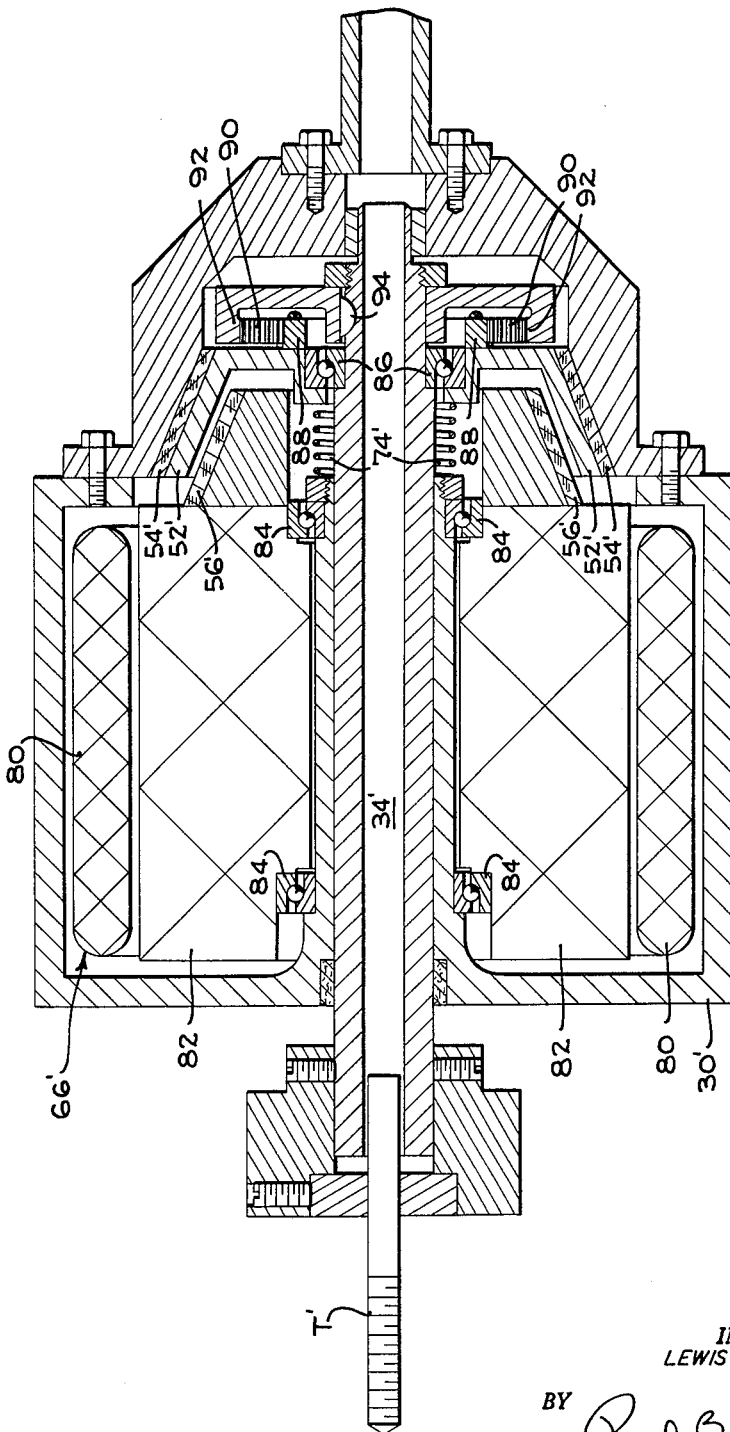

3,204,267
THREADING MECHANISM
Lewis M. Soccio, 2265 Steven Creek Road,
San Jose, Calif.
Filed Mar. 2, 1961, Ser. No. 92,966
1 Claim. (Cl. 10—136)

The present invention relates generally to machine tools and more particularly to threading mechanisms.

When a workpiece is to be threaded, either internally or externally, the threading tap or die must be moved against the workpiece at the same time that relative rotation in a predetermined direction therebetween is, in some fashion, provided. After the thread has been formed, the relative direction of rotation must be reversed to enable withdrawal of the tap or die from the work. Such relative reversal conventionally is achieved by means of an actual reversal of the rotary motion of the workpiece or the threading tool itself. Considerable time is lost, particularly under high speed operation, and damage or destruction of the formed threads frequently occurs.

Accordingly, it is a general object of the present invention to provide a threading mechanism capable of carrying out threading operations with great rapidity but without attendant damage to the threads, even when the workpiece is composed of one of the softer materials, such as copper or brass.

It is a particular feature of the invention to provide a threading mechanism in the form of an attachment for a conventional lathe or other rotary work-supporting machine.

Yet more particularly, it is a feature to provide a threading attachment that is a relatively small, compact unit which can be mounted, for example, on the turret of a lathe wherefore the threading unit can be moved into or out of operative position quickly and easily.

A specific feature of the invention is the arrangement for automatically obtaining relative rotation of the threading tool and workpiece in one direction while the threads are formed and reverse relative rotation when the tool is withdrawn from the threaded workpiece.

Additionally, it is a feature to provide a threading mechanism arranged so that if force is directed axially against threads by the threading tool, the relative direction of rotation of the threading tool is such as to relieve such force to thus substantially eliminate damage to the threads.

Yet another feature in accordance with one aspect of the invention is the provision of a simple speed reduction gear train that connects the cutting tool to a drive mechanism to produce considerable mechanical advantage wherefore such drive mechanism need have but a low power rating, be of small size, and also be very economical.

These as well as other objects and features of the invention will become more apparent from a perusal of the following description of the accompanying drawings wherein:

FIG. 1 is a fragmentary side elevational view of a small turret lathe of conventional design having a threading attachment embodying the present invention mounted thereon, FIG. 2 is an enlarged fragmentary longitudinal sectional view of the threading attachment, and FIG. 3 is an enlarged sectional view somewhat similar to FIG. 2 but illustrating a modified embodiment of the invention.

With initial reference to FIG. 1, the threading attachment, indicated generally at 10, is mounted on a conventional lathe having an elongated bed 12 at one end of which a head stock 14 is formed with its rotary driven spindle 16 projecting therefrom and mounting a chuck 18 on which a workpiece W is secured in a conventional fashion. Conventional ways 22 extend along the top of the lathe bed 12 and slidably mount a carriage 24 that can be shifted along such ways toward or away from the head stock 14 by appropriate rotation of a suitable hand wheel 26. A turret 28 is mounted on the carriage 24 for rotation to various positions about a vertical axis so that various cutting tools can be positioned in axial alignment with the workpiece W and thus brought into cutting engagement therewith when the carriage 24 is appropriately moved.

The mentioned threading attachment 10 is mounted in one receptacle of the turret 28 so that, as clearly illustrated in FIG. 1, such threading attachment can be moved into operative threading position as will become more apparent hereinafter. More particularly, as shown in FIG. 2, the threading attachment 10 includes a generally cylindrical housing 30 from one end of which is a tube 32 projects for reception within the appropriate receptacle of the turret 28. The details of such mounting arrangement will not be described in further detail since they form no part of the present invention, the only requirement being that the threading tool be supported so that it can be brought into operative engagement with the workpiece W when the aforementioned carriage 24 is moved.

A hollow tool-supporting spindle 34 is mounted for rotation on spaced bearings 36, 38 centrally within the cylindrical housing 30 so that one end of the spindle lies adjacent and axially aligned with the described mounting tube 32 for the unit and the other end of the spindle projects from the remote end of the cylindrical housing to carry some form of threading tool also in axial alignment therewith. As shown in FIG. 2, such threading tool is a tap T which is connected by suitable screws 40 to a mounting chuck 42 which, in turn, is secured fixedly to the projecting end of the spindle 34 by additional screws 44. Such arrangement permits easy removability of the tap T when another threading tool must be substituted therefor.

The bearings 36, 38 which support the tool supporting spindle also permit axial sliding motion thereof and in accordance with the present invention, means are provided to hold the spindle 34 against rotation upon axial movement thereof in one direction and to effect rotation of the spindle in the same direction as the work supporting spindle 16 but at a substantially higher rate of speed upon sliding movement of the tool supporting spindle in the opposite direction. Generally, the arrangement is such that upon movement of the tap T against the workpiece W, the reactive force effects sliding movement of the spindle 34 away from the workpiece W or to the right, as viewed in FIG. 2, to stop rotation of the tool-supporting spindle whereupon the existent rotation of the work-supporting spindle 16 enables the top T to gradually enter the workpiece W and form threads thereon. After the threads have been formed, force exerted on the tap T to effect withdrawal thereof produces a reactive force on the spindle 34 to cause the same to move towards the workpiece W, or to the left as viewed in FIG. 2, whereupon rotation of the tool-supporting spindle 34 at a rate of speed higher than that of the work supporting spindle 16 results and the tap T consequently quickly withdraws from the threaded workpiece W to complete the threading operation.

As shown in FIG. 2, the aforementioned means for controlling rotation of the tool-supporting spindle includes a double cone clutch, generally indicated at 50. More particularly, such clutch 50 includes a first clutch member 52 that is centrally secured on the spindle 34 for rotation and axial movement therewith. Adjacent its perimeter, such first clutch member 52 is of generally conical configuration with clutch faces 52a, 52b formed on its opposite surfaces. A second clutch member 54 is formed on the housing 30 and preferably constitutes a conically shaped member composed of cork or other friction material that can be engaged by the outer face 52a of the first clutch member 52 upon axial sliding motion of such first clutch member and the spindle 34 upon which it is mounted to the right as viewed in FIG. 2 to preclude rotation of these members. A third clutch member 56 is also formed of conical shape generally within the conically shaped first clutch member 52 so as to engage the inner face 52b thereof when it and the mounting work spindle are moved thereagainst or to the left as viewed in FIG. 2.

This third clutch member 56 is mounted for rotation by a suitable ball bearing 58 on the housing 30 and it attached to an annular bevel gear 60 which meshes with a spur gear 62 on the downwardly projecting end of the shaft 64 of a suitable electric motor, indicated at 66, and mounted on the housing 30 by suitable bolts. The speed and rotative direction of the motor 66 are such that the third clutch member 56 is driven in the same rotative direction as the work-supporting spindle 16 of the lathe but at a higher rotative speed. As a consequence, if the first clutch member 52 mounted on the spindle 34 is in engagement with this third clutch member 56 and the motor 66 has been energized, the tap T will ultimately be rotated in the same rotative direction as the work-supporting spindle 16 but at a higher rotative speed.

A first coil spring 68 is mounted in compression between a retainer 70 adjustably supported by a nut 72 on the threaded end of the mounting tube 32, and one end of the tool supporting spindle 34 so as to urge the same to the left as viewed in FIG. 2; while a second coil spring 74 is compressed between the housing 30 and the first clutch member 52 to urge the latter to the right so that the spindle is normally balanced in the position illustrated in FIG. 2 whereat the first clutch member is positioned approximately midway between the second and third clutch members 54 and 56. Thus, until axial pressure is exerted against the spindle 34, it is free to rotate.

When a workpiece W is to be threaded by the described threading attachment, a hole of appropriate dimensons is first drilled into the workpiece by a cutting tool (not shown) that can conveniently be mounted in another receptacle of the turret. After such preliminary drilling is completed, the turret 28 is rotated in the normal fashion to bring the threading tap T into alignment with the workpiece W and more particularly with the drilled hole therein. At this time, the electric motor 66 is energized to effect appropriate rotation of the third clutch member 56, but since the first clutch member 52 is held by the springs 68, 74 in its intermediate position, no rotative force is delivered to the spindle 34 or the tap T carried thereby as the same is advanced into threading position.

If it is assumed that a right hand thread is to be formed in the workpiece, the work-supporting spindle 16 of the lathe will be rotated in a counterclockwise direction when viewed from the tap T itself. Thus, when the tap T initially engages the workpiece W lightly, it can rotate therewith but when additional force is applied, the spindle 34 will be urged to the right so that the first clutch member 52 engages the stationary second clutch member 54, and the spindle 34 will then be held against rotation. As a consequence, a clockwise rotation of the tap T relative to the workpiece W is achieved to initiate formation of the desired right-hand thread.

If it is assumed that the workpiece W is being rotated in the described counterclockwise direction and the motor 66 of the attachment has been energized, it is merely necessary for the operator to move the tap T into engagement with the workpiece by appropriate rotation of the hand wheel 26. Since the tap is held against rotation as a result of engagement with the workpiece W, as described above, relative rotation between the tap T and the workpiece W is instigated from the very moment of pressed contact between these members. After such contact has been established, continued force applied by the operator by way of the hand wheel 26 maintains the aforementioned reactive force against the tap T and the mounting spindle 34 therefor to thus press the first clutch member 52 continuously against the fixed second clutch member 54 to thus assure a continued positive threading operation. If at any time during or after the threading operation, the operator wishes to stop the operation, it is merely necessary for him to turn the hand wheel 26 slightly in the opposite direction whereupon the action of the springs 68, 74 will effect withdrawal of the first clutch member 52 from engagement with the second fixed clutch member 54 and the tap T and spindle 34 are then free to rotate and accordingly will be rotated with the workpiece so that no damage to the existing threads will occur. Yet further reverse rotation of the hand wheel 26 will effect engagement of the first clutch member 52 with the rotating third clutch member 56 so that rotation of the tap T in a direction like that of the workpiece W but at a higher rate of speed will occur. Again, no great axial pressure will be exerted against the threads and they will not be damagd even if the workpiece W is composed of a relatively soft metal such as copper or brass. It will be apparent that the operator has complete control of the advance or withdrawal of the tap T at all times and will merely exert enough pressure by turning of the hand wheel 26 to effect engagement of the clutch members but will not exert excessive pressure and thereby avoid any thread damage.

Thus summing up, the tap T can be driven rapidly into the workpiece W to perform a threading operation and can immediately thereafter be withdrawn with substantially equal rapidity; yet at no time will the threads be damaged or destroyed, since the device automatically rotates in that direction to relieve any axial pressure which might be exerted by the tap T on the threads. With practical regard to the rapidity of operation obtainable, the work-supporting spindle 16 may be rotated at 1200 r.p.m. for relatively small holes and the tool-supporting spindle may, for example, be rotated in the same direction at 2000 r.p.m; wherefore ultimately, a hole one inch in depth can be tapped and the tap T removed within a period of less than ten seconds.

A slightly modified embodiment of the invention is illustrated in FIG. 3 wherein the spindle 34', the tap T' and the mounting arrangement therefor as well as certain additional elements are of generally similar nature so as to be indicated by like reference numerals with but an added prime notation. This modified embodiment incorporates a different drive mechanism including a speed reduction gear train so that it is more readily adapted for the tapping or external threading of larger workpieces. More particularly, an electric motor 66' of specific design is incorporated in this modified structure and includes a field winding 80 that is mounted within a generally cylindrical housing 30' and a rotor 82 mounted within such field winding 80 and coaxial with the tool-supporting spindle 34', being suitably supported for rotation therearound on suitable ball bearings 84. One end of the rotor 82 is formed to provide the third conical clutch member 56' which, of course, rotates with the rotor and is adapted to engage one face of a first conical clutch member 52' supported for free rotation on ball bearings 86 about the spindle 34' and normally held against a fixed second clutch member 54' by a spring 74' but adapted for movement into engagement with the third rotary clutch member 56' on the rotor 82. The rotatively supported first clutch member 52' carries an external ring gear 88 at one side which ring gear meshes with a pair of small spider gears 90 which, in turn, mesh with an internal ring gear 92 formed on a laterally directed flange of a circular plate whose interior is keyed to the spindle 34' as indicated at 94. Thus, when the first clutch member 52' is rotated through engagement with the third clutch member 56' on the rotor 82, such rotative force is transmitted through the described gears 88, 90, 92 to the spindle 34' wherefore a speed reduction occurs in an amount dependent upon the dimensions of such gears. The dimensions of the gears are arranged in accordance with the present invention and as explained in detail in connection with the description of the first embodiment of the invention so that the tap T', when driven, will rotate at a speed in excess of that of the work piece W thereby effecting the requisite withdrawal of the tap from the threaded bore. The described construction is such that when the spindle 34' itself is shifted axially, the ring gear 88 and the associated first clutch member 52' move axially therewith so as to either establish clutching engagement with the fixed second clutch member 54' or with the rotary third clutch member 56' depending upon the direction of such axial shifting motion. It will be apparent that the operation of this modified structure is substantially the same as that of the previous embodiment and thus need not be repeated.

Quite obviously, various other alterations and/or modifications can be made without departing from the spirit of the invention, and the foregoing description of two embodiments is to be considered as purely exemplary and not in a limiting sense. The actual scope of the invention is to be indicated by reference to the appended claim.

What is claimed is:

A threading attachment for a machine tool having a rotary work-supporting spindle and a carriage mounted for sliding movement axially toward and away from the work-supporting spindle which attachment comprises a tool-supporting spindle mounted on the carriage for rotation and for limited axial sliding movement relative thereto, continuously operative drive means adapted to rotate said tool-supporting spindle in the same rotative direction as that of the rotary work-supporting spindle but at a higher rotative speed, and means automatically operative in response to axial motion of said tool-supporting spindle in one direction to preclude rotative motion thereof and in the other direction to connect said tool-supporting spindle to said drive means, said automatically operative means including a first clutch member connected to said tool-supporting spindle and moveable axially therewith, a second clutch member fixed against rotation and engageable by said first clutch member upon axial motion of said spindle in one direction, a third clutch member connected to said drive means and engageable by first clutch member upon axial motion of said spindle in the opposite direction, and a speed reduction gear train connecting said first clutch member to said tool-supporting spindle.

References Cited by the Examiner

UNITED STATES PATENTS

| | | | |
|---|---|---|---|
| 1,602,504 | 10/26 | Readey | 10—137 |
| 1,630,541 | 5/27 | Sandstrom | 10—136.1 |
| 1,746,038 | 2/30 | Hegstad. | |
| 2,323,970 | 7/43 | Bird et al. | |
| 2,708,277 | 5/55 | Holt | 10—136.1 |

FOREIGN PATENTS

| | | |
|---|---|---|
| 706,273 | 3/54 | Great Britain. |
| 742,637 | 12/55 | Great Britain. |

ANDREW R. JUHASZ, *Primary Examiner.*

HUNTER C. BOURNE, Jr., WILLIAM W. DYER, Jr., *Examiners.*